United States Patent
Ozeki et al.

(10) Patent No.: US 7,485,990 B2
(45) Date of Patent: Feb. 3, 2009

(54) ELECTRONIC APPARATUS, FEED SWITCH CONTROLLING METHOD AND FEED SWITCH SETTING METHOD FOR ELECTRONIC APPARATUS

(75) Inventors: Akihiro Ozeki, Ome (JP); Takashi Fujimoto, Ome (JP); Kenji Hibi, Ome (JP); Koji Nakamura, Akiruno (JP); Hideo Kumagai, Yokohama (JP); Ryoji Ninomiya, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 590 days.

(21) Appl. No.: 10/788,030

(22) Filed: Feb. 27, 2004

(65) Prior Publication Data

US 2004/0212345 A1    Oct. 28, 2004

(30) Foreign Application Priority Data

Feb. 28, 2003   (JP)   ............................. 2003-053045

(51) Int. Cl.
    *H02J 7/00*   (2006.01)
    *H02J 1/10*   (2006.01)
(52) U.S. Cl. ......................................... 307/150; 307/43
(58) Field of Classification Search ................... 307/65, 307/85, 150
    See application file for complete search history.

(56) References Cited

U.S. PATENT DOCUMENTS

| | | | |
|---|---|---|---|
| 3,987,352 A | 10/1976 | Hirota | |
| 4,677,037 A | 6/1987 | Takabayashi | |
| 4,962,462 A | 10/1990 | Fekete | |
| 4,968,566 A | 11/1990 | Lersch et al. | |
| 5,780,980 A | 7/1998 | Naito | |
| 5,916,699 A | 6/1999 | Thomas et al. | |
| 5,964,309 A | 10/1999 | Kimura et al. | |
| 5,976,725 A * | 11/1999 | Gamo et al. | ................... 429/25 |
| 6,103,409 A | 8/2000 | DiPierno Bosco et al. | |
| 6,326,097 B1 | 12/2001 | Hockaday | |
| 6,392,383 B1 * | 5/2002 | Takimoto et al. | ............ 320/115 |
| 6,649,298 B2 * | 11/2003 | Hayashi et al. | ............... 429/34 |

(Continued)

FOREIGN PATENT DOCUMENTS

DE          44 31 747 A1        3/1995

(Continued)

OTHER PUBLICATIONS

Chinese Office Action dated Jul. 29, 2005 for Appln. No. 200410007281.X.

(Continued)

*Primary Examiner*—Stephen W Jackson
*Assistant Examiner*—Michael Rutland Wallis
(74) *Attorney, Agent, or Firm*—Pillsbury Winthrop Shaw Pittman, LLP

(57) ABSTRACT

The power supply controller serves to distribute electric power to each part of the electronic apparatus for operation, and the electric power can be fed from the AC power source, the fuel cell unit and the secondary battery unit. The power supply controller transmits the data signal indicating from which of the AC power source, the fuel cell unit and the secondary battery unit, the electricity is fed, to the CPU via the built-in register. The CPU displays the use status of the AC power source, the fuel cell unit and the secondary battery unit on the LCD via the display controller.

3 Claims, 9 Drawing Sheets

U.S. PATENT DOCUMENTS

| | | | |
|---|---|---|---|
| 6,854,028 B2 * | 2/2005 | Smith | 710/100 |
| 7,084,762 B2 * | 8/2006 | Pedrazzini et al. | 340/545.5 |
| 7,119,458 B2 * | 10/2006 | Barnes et al. | 307/65 |
| 2001/0052433 A1 * | 12/2001 | Harris et al. | 180/68.5 |
| 2002/0055029 A1 | 5/2002 | Hayashi et al. | |
| 2002/0056134 A1 | 5/2002 | Abe et al. | |
| 2003/0142467 A1 | 7/2003 | Hachiya et al. | |

FOREIGN PATENT DOCUMENTS

| | | |
|---|---|---|
| EP | 1 091 437 A1 | 4/2001 |
| EP | 1 233 468 A2 | 8/2002 |
| GB | 1131171 | 10/1968 |
| GB | 1 304 092 | 1/1973 |
| JP | 08-148173 | 6/1996 |
| JP | 11-154520 | 6/1999 |
| JP | 2002-16524 A | 1/2002 |
| JP | 2002-032154 | 1/2002 |
| JP | 2002-49440 | 2/2002 |
| JP | 2002-049440 A * | 2/2002 |
| JP | 2002-63920 | 2/2002 |
| JP | 2002-169629 | 6/2002 |
| JP | 2002-198077 A | 7/2002 |
| JP | 2002-324562 | 11/2002 |
| JP | 2003-007322 | 1/2003 |
| JP | 2003-045468 | 2/2003 |
| JP | 2004-120887 | 4/2004 |
| WO | WO 98/56058 | 12/1998 |
| WO | WO 01/79012 A2 | 10/2001 |
| WO | WO 2004/031929 A1 | 4/2004 |
| WO | WO 2004/032269 A2 | 4/2004 |

OTHER PUBLICATIONS

Office Action dated Jun. 7, 2005 for Appln. No. 2003-053045.
Shuji Abe, U.S. Appl. No. 10/826,910, filed Apr. 19, 2004.
Shuji Abe, U.S. Appl. No. 10/848,064, filed May 19, 2004.
Shuji Abe, U.S. Appl. No. 10/860,788, filed Jun. 4, 2004.
Jaesung Han et al., "Direct methanol fuel-cell combined with a small back-up battery," Journal of Power Sources 112, Elsevier Science B.V., p. 477-483, (Aug. 3, 2002).
Kohnosuke Ikeda, "Nenryo Denchi no Subete (All about fuel cell)," Nihon Jitsugyo Shuppan, p. 216-217, ( Aug. 20, 2001).
Akihiro Ozeki, U.S. Appl. No. 10/760,632, filed Jan. 12, 2004.
Shogo Hachiya, U.S. Appl. No. 10/352,057, filed Jan. 28, 2003.
Akihiro Ozeki, U.S. Appl. No. 10/743,560, filed Dec. 23, 2003.
Akihiro Ozeki, U.S. Appl. No. 10/758,275, filed Jan. 16, 2004.
Akihiro Ozeki, U.S. Appl. No. 10/787,861, filed Feb 27, 2004.
Akihiro Ozeki, U.S. Appl. No. 10/805,497, filed Mar. 22, 2004.
Akihiro Ozeki, U.S. Appl. No. 10/806,334, filed Mar. 23, 2004.

* cited by examiner

| Feed state | AC | Fuel cell unit | Secondary battery unit |
|---|---|---|---|
| Charge state | ⌁ : AC (※1) | ▨ : Fuel cell (※1) | 🔋 : Secondary battery (※1) |
|  | ⌁ → 🔋 From AC to secondary battery | ▨ → 🔋 Secondary battery from fuel cell | — |
| Remaining | — | X: fuel tank none ▨ 60: remaining 60% | 🔋 100: remaining 100% |

(※1) Blue : feeding   Orange : standby for feeding

FIG. 5

ELECTRONIC APPARATUS, FEED SWITCH CONTROLLING METHOD AND FEED SWITCH SETTING METHOD FOR ELECTRONIC APPARATUS

CROSS-REFERENCE TO RELATED APPLICATIONS

This application is based upon and claims the benefit of priority from prior Japanese Patent Application No. 2003-053045, filed Feb. 28, 2003, the entire contents of which are incorporated herein by reference.

BACKGROUND OF THE INVENTION

1. Field of the Invention

The present invention relates to a battery maintenance technique applied to an electronic apparatus in which a plurality of types of batteries can be mounted at the same time.

2. Description of the Related Art

Recently, various types of portable electronic apparatus that are driven by a battery, such as a portable information apparatus called PDAs (personal digital assistants) and a digital camera, have been developed and they are widely used.

Meanwhile, the environmental problem has become a focus of attention, and environment-friendly batteries are being actively developed. A well-known example of such a type of battery is a direct methanol fuel cell (to be abbreviated as DMFC hereinafter).

The DMFC generates electric energy by a chemical reaction occurring between methanol, which is supplied as the fuel, and oxygen, and it has a structure in which an electrolyte is sandwiched between two electrodes made of porous metal or carbon. (See, for example, "Nenryou Denchi no Subete" (All about fuel cell) by Kohnosuke Ikeda, published by Nihon Jitsugyo Shuppan, Aug. 20, 2001, pages 216 to 217.) Since the DMFC does not generate harmful waste materials, there is a strong demand for applying this cell to those electronic apparatuses listed above.

For example, Jpn. Pat. Appln. KOKAI Publication No. 2002-49440 filed by the inventor of the present invention discloses (in paragraph [0024]) a portable information apparatus that uses a fuel cell. In the portable information apparatus, an integrated Li battery can be used as in the conventional case, as additional means to its fuel cell. When electricity is fed from the integrated Li battery, the apparatus can be operated at high-speed and high-performance mode, which use a high-level power, can be carried out. On the other hand, when electricity is fed from the fuel cell, it can be operated at an exclusive fuel cell mode in which the consumption power falls within a certain range.

In the portable information apparatus that is disclosed in Jpn. Pat. Appln. KOKAI Publication No. 2002-49440 filed by the inventor of the present invention, an operation mode that is selected at a time is determined depending on which of the fuel cell and integrated Li battery the electricity is fed. With this arrangement, it becomes possible to automatically set a suitable operation environment for the characteristics of the respective battery selected by the user.

In reverse, there have been no such functions developed that a most suitable battery is automatically selected from a plurality of batteries depending on the particular situation at that time, or a battery to be used is set in advance by the user for each respective situation. Accordingly, there have been no functions developed for displaying the use status of a plurality of batteries at the time, that is, from which of a fuel cell and integrated Li battery, the electricity is fed.

BRIEF SUMMARY OF THE INVENTION

According to an embodiment of the present invention, an electronic apparatus comprises a main body, a first battery unit having a fuel cell configured to supply power to the main body, a second battery unit having a secondary battery configured to supply electrical power to the main body, a control unit configured to determine which of the first battery unit and the second battery unit, the power should be supplied, in accordance with a condition of the main body.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a diagram showing a list of icons indicating the use status of an AC power source, fuel cell unit and secondary battery unit, displayed in a task tray by the electronic apparatus of the embodiment;

DETAILED DESCRIPTION OF THE INVENTION

An embodiment of the present will now be described with reference to accompanying drawings.

Figure 1:
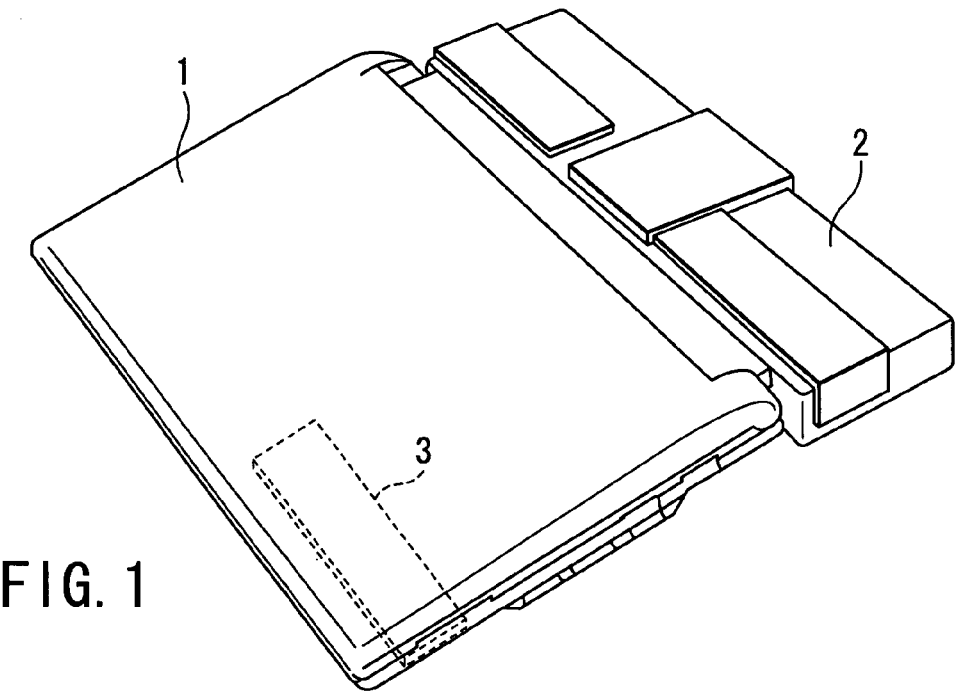
FIG. 1 is a diagram showing an appearance of an electronic apparatus system according to an embodiment of the present invention.

FIG. 1 is a diagram showing an appearance of the electronic apparatus system according to an embodiment of the present invention.

An electronic apparatus 1 of this electronic apparatus system is a so-called notebook personal computer. In the computer, a cover portion in which a liquid crystal display (LCD) is arranged in an inner wall surface thereof, is openably mounted to the main body by means of hinge mechanisms. The electronic apparatus 1, as shown in FIG. 1, has a structure in which a fuel cell unit 2 including a DMFC can be separably mounted onto a back portion thereof. Further, a bottom portion thereof can removably house a secondary battery unit 3 including a lithium ion battery. A side portion of the electronic apparatus 1 has an AC connector (not shown), and when an AC cord (plugged to a power source outlet) is connected to the AC connector, the apparatus can use the AC power source.

Figure 2:
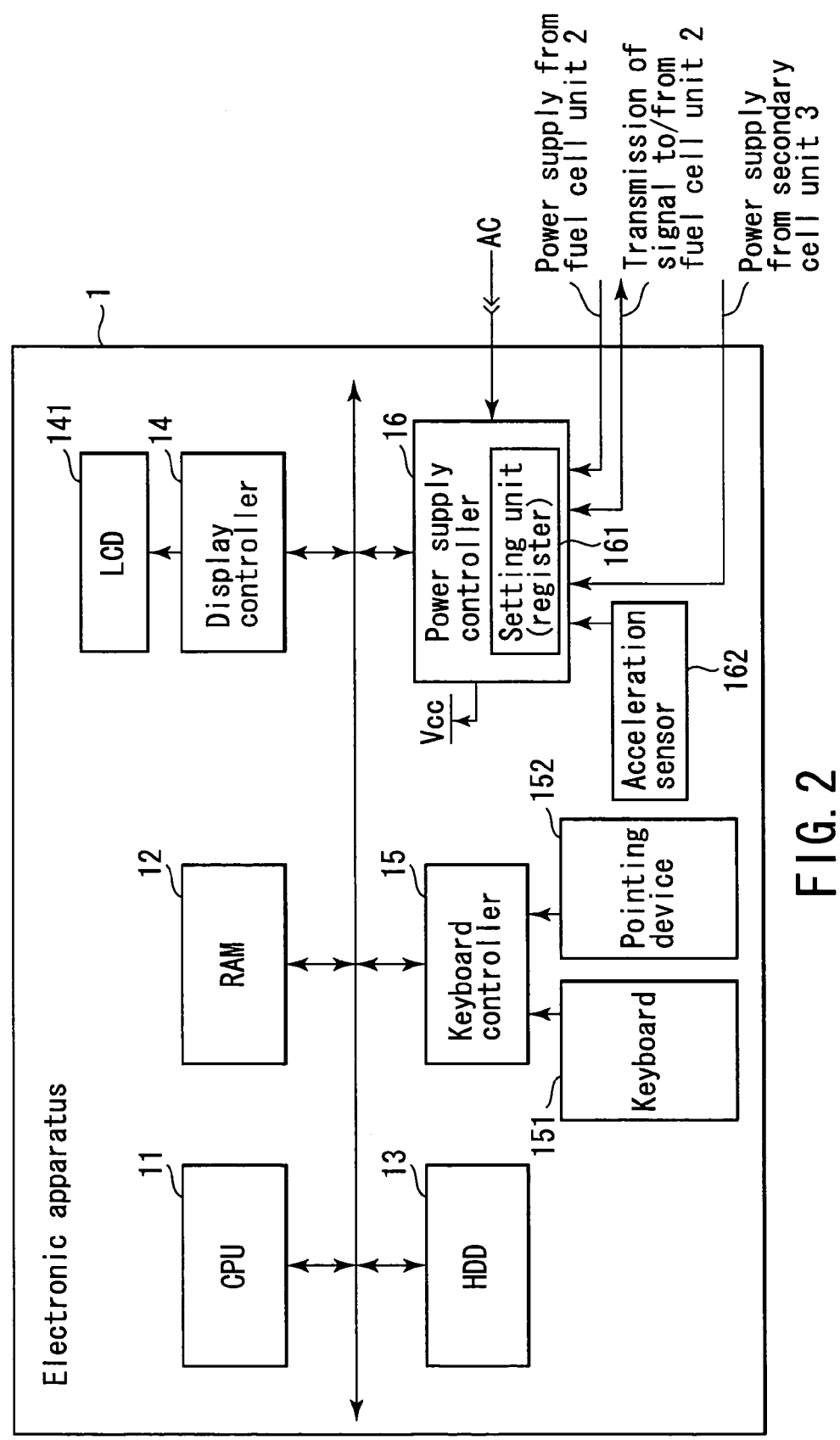
FIG. 2 is a diagram showing a brief structure of an electronic apparatus according to the embodiment.

FIG. 2 is a diagram showing the brief structure of the electronic apparatus 1.

As shown in the figure, the electronic apparatus 1 includes a CPU 11, a RAM 12, an HDD 13, a display controller 14, a keyboard controller 15 and a power supply controller 16, which are connected to a system bus.

The CPU 11 serves to control the operation of the entire electronic apparatus 1, and executes various kinds of programs stored in the RAM 12, including the operating system, utility software and application software.

The RAM 12 is a storage medium serving as the main storage of the electronic apparatus 1, and it stores various types of programs to be executed by the CPU 11 and various types of data used by these programs. On the other hand, the HDD 13 is a large-capacity storage medium provided for the electronic apparatus 1, and it stores a large amount of various types of programs and various types of data, as an auxiliary device for the RAM 12.

The display controller 14 is a device designed for outputting in the user interface of the electronic apparatus 1, and more specifically, it controls displaying of screen image data processed by the CPU 11 on an LCD 141 (arranged in the inner wall surface of the cover portion). On the other hand, the keyboard controller 15 is a device designed for inputting in the user interface of the electronic apparatus 1, and more specifically, it transmits the operation contents of a keyboard 151 and a pointing device 152 to the CPU 11.

The power supply controller 16 is designed to supply power for operation to each member of the electronic apparatus 1. Thus controller 16 has functions of receiving power supplied from each of the AC power source, fuel cell unit 2 and secondary battery unit 3, and transmitting/receiving various signals with a micro-computer 21 of the fuel cell unit 2, which will be later described. Further, the power supply controller 16 is equipped with a register 161 for setting how the AC power source, fuel cell unit 2 and secondary battery unit 3 are used without confusion. Further, the power supply controller 16 receives an output signal from an acceleration sensor 162 in order to detect if the electronic apparatus 1 is in an unstable condition where it is being carried by the user on the move or if the apparatus 1 is in a stable condition where it is placed on a desk to be used.

Figure 3:
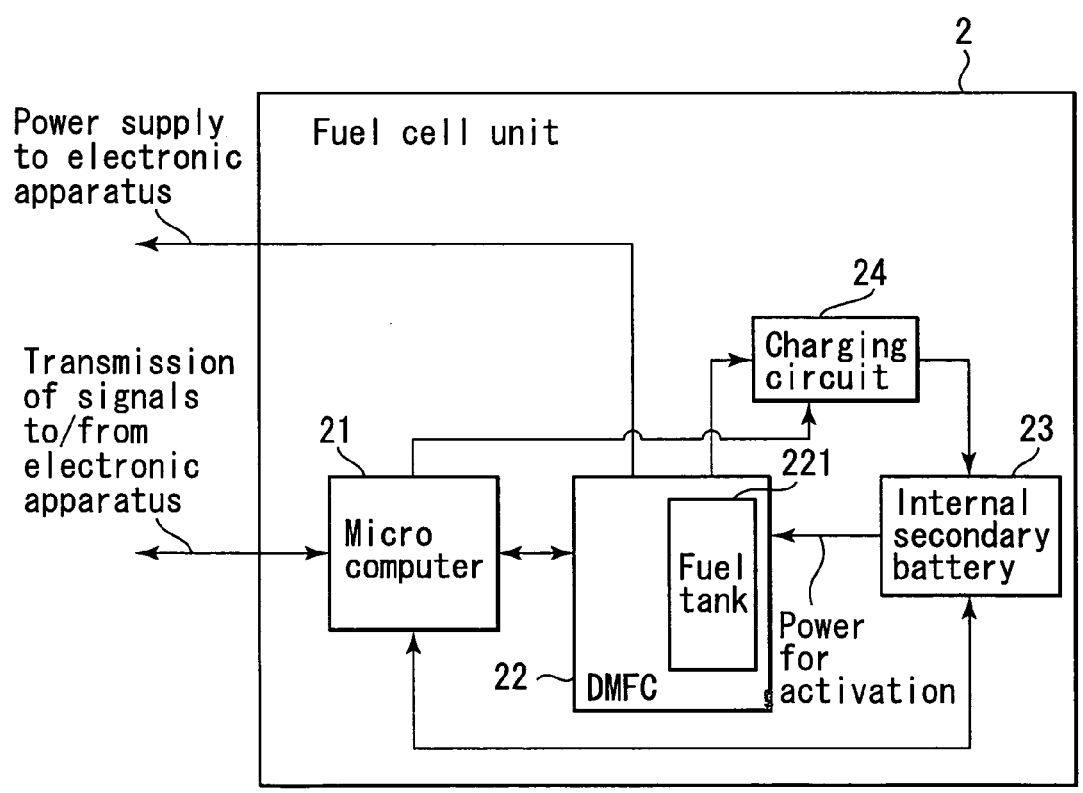
FIG. 3 is a diagram showing a brief structure of a fuel cell unit according to the embodiment.

FIG. 3 is a diagram showing the brief structure of the fuel cell unit 2.

As shown in this figure, the fuel cell unit 2 includes a microcomputer 21, a DMFC 22, an internal secondary battery 23 and a charging circuit 24.

The microcomputer 21 serves to control the operation of the entire fuel cell unit 2, and it executes transmission/reception of various-signals with respect to the electronic apparatus 1. The various type of signals includes a signal that indicates whether a fuel tank 221, which will be later described, is mounted or not, and a signal indicating the remaining amount of the fuel tank 221. The DMFC 22 outputs electrical energy generated by a chemical reaction induced by reacting methanol with oxygen in the air. The DMFC 22 has a slot for removably housing the fuel tank 221 in which methanol is stored. The DMFC 21 used here is a so-called auxiliary type DMFC, which actively take in methanol from the fuel tank 221 and air by means of a pump or the like. Part of the generated power is assigned for the operation of this auxiliary device.

The internal secondary battery 23 is, for example, a lithium ion battery that can be repeatedly charged/discharged for supplying the power needed by the auxiliary device at the DMFC 21 is activated. The charge circuit 24 can serve to charge the internal secondary battery 23 with the charge generated by the CMFC 22 in accordance with an instruction from the microcomputer 21.

The electronic apparatus system having the above-described structure has three feeding sources, namely, the AC power source, the fuel cell unit 2 and the second battery unit 3. With this structure as it is, there is no information available to the user as to the feeding source for the personal computer 1, and therefore the user does not know which feeding source is currently used. In order to clear this drawback, the electronic apparatus system of the present invention is provided with the electronic apparatus 1 that indicates the use state of the AC power source, the fuel cell unit 2 and the secondary cell unit 3.

Figure 4:
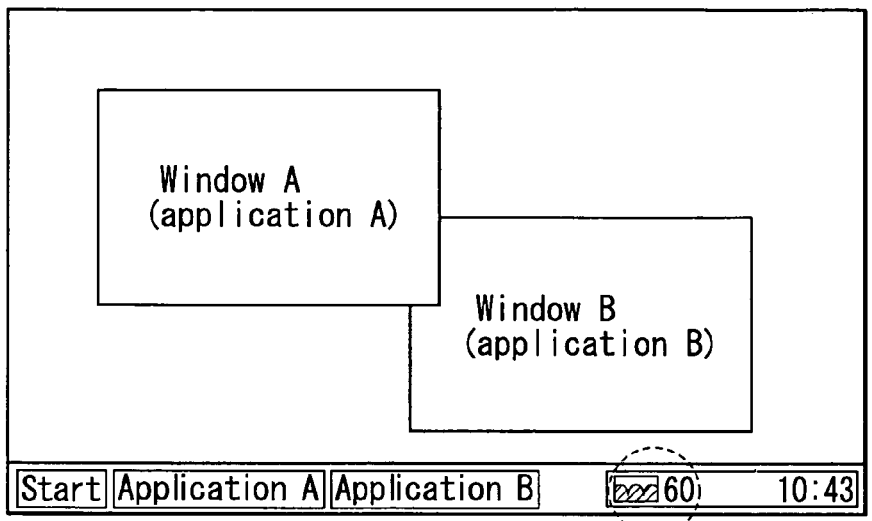
FIG. 4 is a diagram showing an example of the screen image to be displayed on an LCD by the electronic apparatus of the embodiment.

FIG. 4 is a diagram showing an example of the screen images to be displayed on the LCD 14 by the electronic apparatus 1. In this example, two application software programs, that is, applications A and B, are in operation, and each of windows A and B is displayed on the screen. Further, the lower section of the screen has sections assigned for regions called task bars, in which respective buttons are displayed to call up application A or B easily by a clicking operation.

Further, on the right end section of the task bars, there are regions called task trays created. In this task tray, an icon indicating the statues of a resident software piece that is in operation in the background, for example, is displayed, and therefore the task tray is called an indicator region. In the electronic apparatus 1, the icon (X) that indicates a use status of the AC power source, the fuel cell unit 2 and the secondary battery unit 3 is displayed in the task tray.

FIG. 5 is a diagram showing a list of icons indicating the use statuses of the AC power source, the fuel cell unit 2 and the secondary battery unit 3, to be displayed in a task tray by the electronic apparatus 1.

The power supply controller 16 is monitoring whether or not the AC power source is connected, the fuel cell unit 2 is mounted and the secondary battery unit 3 is housed, and the result is stored in the built-in register. In the meantime, the CPU 11 accesses the built-in register of the power supply controller 16 to obtain information on these statues, and displays one of icons shown in the upper section of FIG. 5 in the task tray. The power supply controller 16 stores information indicating from which of the AC power source, the fuel cell unit 2 and the secondary battery unit 3, the electricity is fed, in the built-in register. Based on the information, the CPU 11 controls the display color of each icon. For example, in the case where the fuel cell unit 2 and the second battery unit 3 are in a usable status and the electricity is fed from the fuel cell unit 2, the two icons appearing in FIG. 5, the upper column at the middle and right-hand side, are displayed in the task tray. Here, the icon shown in the upper column section at the middle is distinguished by a blue color and the icon shown in the upper column section on the right-hand side is distinguished by an orange color.

With the above-described arrangement, the user is able to confirm, at a glance, from which of the fuel cell unit 2 and the secondary battery unit 3, the electricity is fed, when the electronic apparatus 1 is used in such a condition that the fuel cell unit 2 is mounted and the secondary battery unit 3 is housed.

Further, by communicating with the microcomputer 21 of the fuel cell unit 2, the power supply controller 16 monitors whether or not the fuel tank 221 is mounted and the fuel remaining amount, and it is able to obtain the information on the remaining amount of the secondary battery unit 3. The power supply controller 16 stores information on various statues of the fuel cell unit 2 in the built-in register. The power supply controller 16 also executes the charge control of the second battery unit 3 based on the information, and stores information on whether or not the unit is charged, in the built-in register.

Let us suppose now that the secondary battery unit 3 is being charged by the AC power source under the control of the power supply controller 16. In this case, the CPU 11 displays the icon shown in FIG. 5 in the middle column at the left-hand side, in the task tray. On the other hand, in the case where, the secondary battery unit 3 is being charged by the electrical power generated by the fuel cell unit 2, the CPU 11 displays the icon shown in FIG. 5 in the middle column at the middle, in the task tray.

Further, the CPU 11 displays whether or not the fuel tank 221 is mounted and the fuel remaining amount with the icon shown in FIG. 5 in the lower column at the middle. Further, the CPU 11 displays the remaining amount of the secondary battery unit 3 with the icon shown in FIG. 5 in the lower column at the right-hand side.

As described above, the electronic apparatus 1 displays the use status of the AC power source, the fuel cell unit 2 and the secondary battery unit 3 by means of an icon displayed in the task tray, so as to clearly indicate what sort of feeding is being carried out.

It should be noted that the power supply controller 16, when receiving information indicating any change in the status of the fuel cell unit 2 or the secondary battery unit 3 occurs, informs the CPU 11 as such. Based on this reported information, the CPU 11 accesses the built-in register of the power supply controller 16 and switches the icon in the task tray. Here, the display of an icon by the CPU 11 is realized by one of the utility software programs loaded from the HDD 13 to the RAM 12.

So far, how the AC power source, the fuel cell unit 2 and the secondary battery unit 3 are used, that is, the mechanism for indicating the current condition of battery use has been described. Now, the mechanism of automatically switching the feeding source among the AC power source, the fuel cell unit 2 and the secondary battery unit 3 in accordance with the current situation, will be described. FIGS. 6 to 9 are flowcharts indicating the flow of the feed switch control executed by the power supply controller 16 of the electronic apparatus 1.

Figure 6:
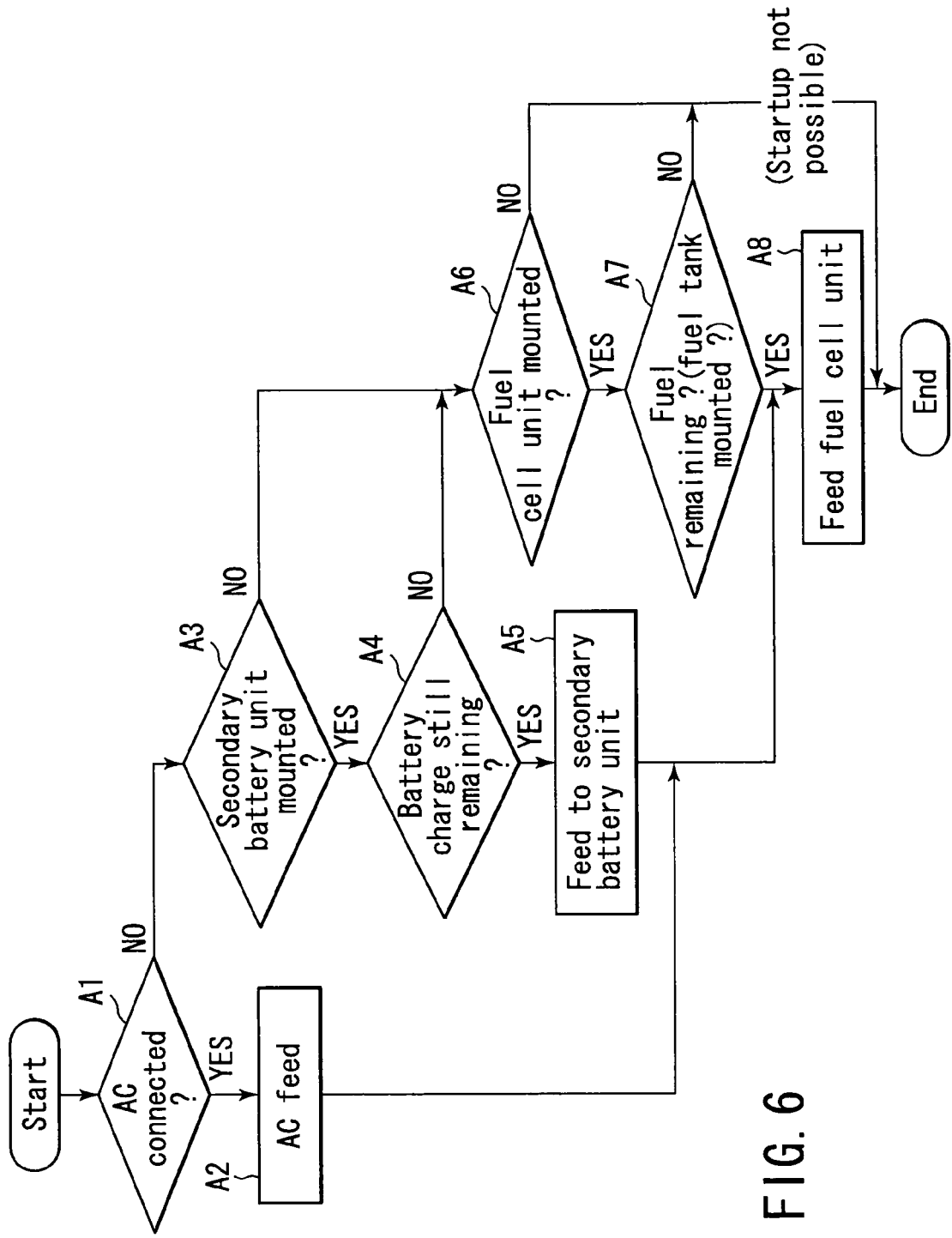
FIG. 6 is a flowchart illustrating the follow of the feed switch control at the time of startup of the electronic apparatus of the embodiment.

FIG. 6 is a flowchart indicating the flow of the feed switch control at the startup of the electronic apparatus 1.

When a startup of the electronic apparatus 1 is instructed, the power supply controller 16, first, examines whether or not the AC power source is connected (Step A1). If connected (YES in Step A1), the power supply controller 16 carries out a switching control such that the electricity is fed from the AC power source (Step A2).

If the AC power source is not connected (NO in Step A1), the power supply controller 16, then, examines whether or not the secondary battery unit 3 is mounted (Step A3). If mounted (YES in Step A3), the power supply controller 16 examines whether or not its battery remaining amount is sufficient to execute the startup operation (Step A4). If there is a sufficient battery remaining amount (YES in Step A4), the power supply controller 16 carries out a switching control such that the electricity is fed from the secondary battery unit 3 (Step A5).

On the other hand, in the case where neither the secondary battery unit 3 is not mounted (NO in Step A3), or there is not a sufficient battery remaining amount in the secondary battery unit 3 when it is mounted (NO in Step A4), then the power supply controller 16 examines whether or not the fuel cell unit 2 is mounted (Step A6). If it is mounted (YES in Step A6), the power supply controller 16 examines if the amount of fuel remaining in the fuel tank 221 is sufficient to execute the startup operation, the examination here including whether or not the fuel tank 221 is mounted (Step A7). If there is a sufficient amount of fuel remaining (YES in Step A7), the power supply controller 16 carries out a switching control such that the electricity is fed from the fuel cell unit 2 (Step A8).

It should be noted that in the case where the fuel cell unit 2 is not mounted (NO in Step A6) or there is not sufficient amount of fuel remaining in the mounted unit (NO in Step A7), the electronic apparatus 1 is not started.

The DMFC 22 built in the fuel cell unit 2, when it is activated, requires some time before it becomes able to supply power. For this reason, when starting up the electronic apparatus 1, the feeding from the AC power source or the secondary battery unit 3 is performed with a priority to the feeding from the fuel cell unit 2, and thus the apparatus can be started up more quickly. Further, the priority order of the AC power source, the fuel cell unit 2 and the secondary battery unit 3 can be set by, for example, setting the operation environment to a desired one. If a high priority is given to the fuel cell unit 2, it is alternatively possible to automatically switch to the feeding from the fuel cell unit 2 after the startup operation is successfully completed.

Figure 7:
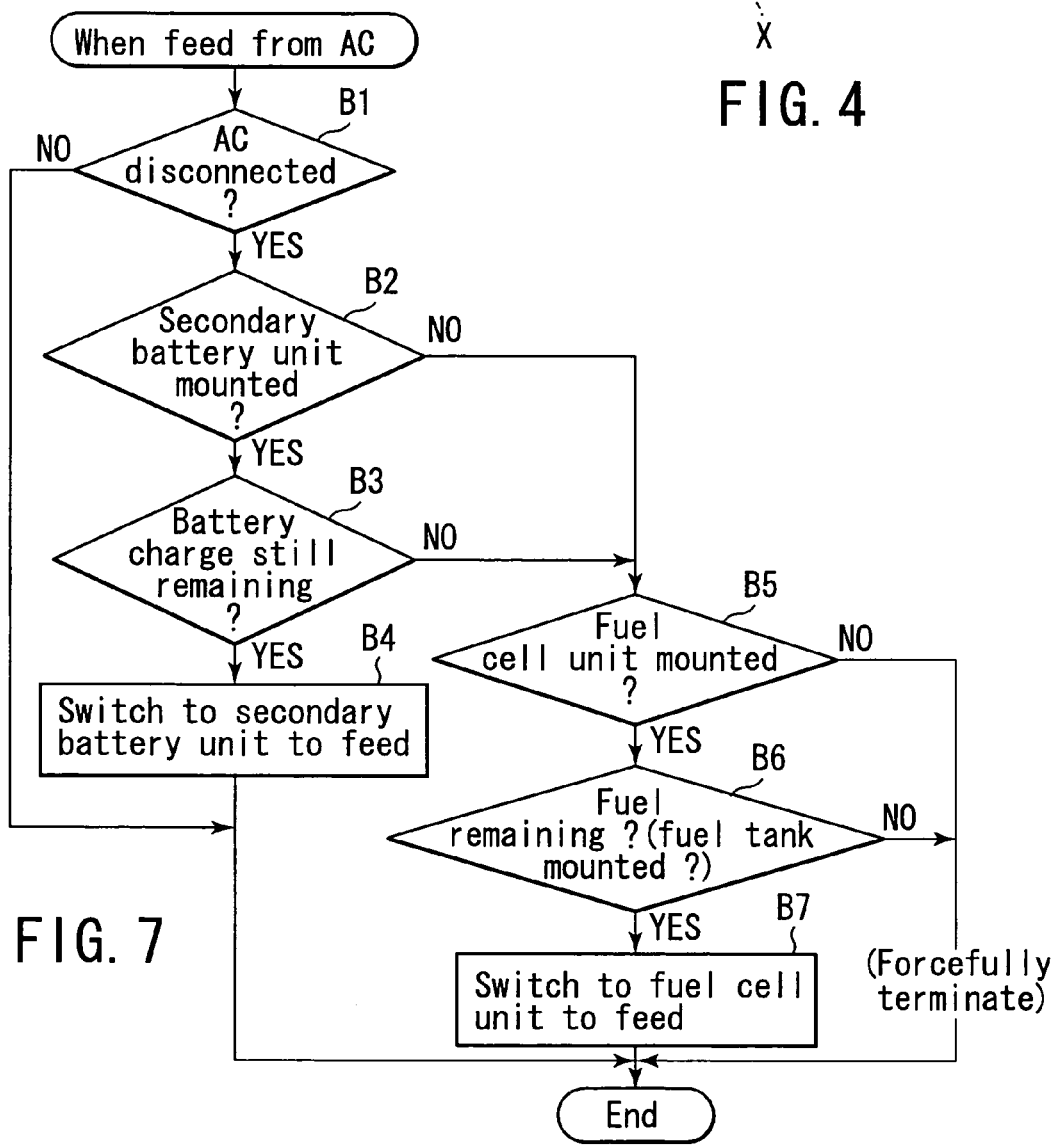
FIG. 7 is a flowchart illustrating the follow of the feed switch control at the time of feeding electricity from the AC power source of the electronic apparatus of the embodiment.

FIG. 7 is a flowchart illustrating the follow of the feed switch control at the time of feeding electricity from the AC power source.

When the electricity is fed from the AC power source, the power supply controller 16 monitors whether or not the AC power source is cut off (Step B1). If it is cut off (YES in Step B1), the power supply controller 16, first, examines whether or not the secondary battery unit 3 is mounted (Step B2).

In the case where the secondary battery unit 3 is mounted (YES in Step B2), the power supply controller 16 then examines if there is a sufficient battery remaining amount (Step B3). If there is a sufficient battery remaining amount (YES in Step B3), the power supply controller 16 carries out a switching control such that the electricity is fed from the secondary battery unit 3 (Step B4).

On the other hand, in the case where neither the secondary battery unit 3 is not mounted (NO in Step B2), or there is not a sufficient battery remaining amount in the secondary battery unit 3 when it is mounted (NO in Step B3), then the power supply controller 16 examines whether or not the fuel cell unit 2 is mounted (Step B5). If it is mounted (YES in Step B5), the power supply controller 16 examines if the amount of fuel remaining in the fuel tank 221 is sufficient to execute the startup operation, the examination here including whether or not the fuel tank 221 is mounted (Step B6). If there is a sufficient amount of fuel remaining (YES in Step B6), the power supply controller 16 carries out a switching control such that the electricity is fed from the fuel cell unit 2 (Step B7).

It should be noted that in the case where the fuel cell unit 2 is not mounted (NO in Step B5) or there is not sufficient amount of fuel remaining in the mounted unit (NO in Step B6), the electronic apparatus 1 is forcefully turned off.

The fuel cell unit 2 generates electricity by using methanol as fuel, and therefore it requires a cost to purchase a fuel tank 211, which is a consumable item. Therefore, when the AC power source is cut off, the feeding source is automatically switched with a priority given to the secondary battery unit 3 rather than the fuel cell unit 2.

It should be noted that the fuel cell unit 2 has such a merit that it can be unlimitedly driven continuously as long as the fuel tank 211 is replaced. Therefore, there may be, in some cases, a demand of using the fuel cell unit 2 with a priority rather than the secondary battery unit 3 that can be continuously driven only within the range of the battery capacity. In order to meet this demand, it suffices if the Steps B2 to B4 are replaced with Steps B5 to B7.

Figure 8:
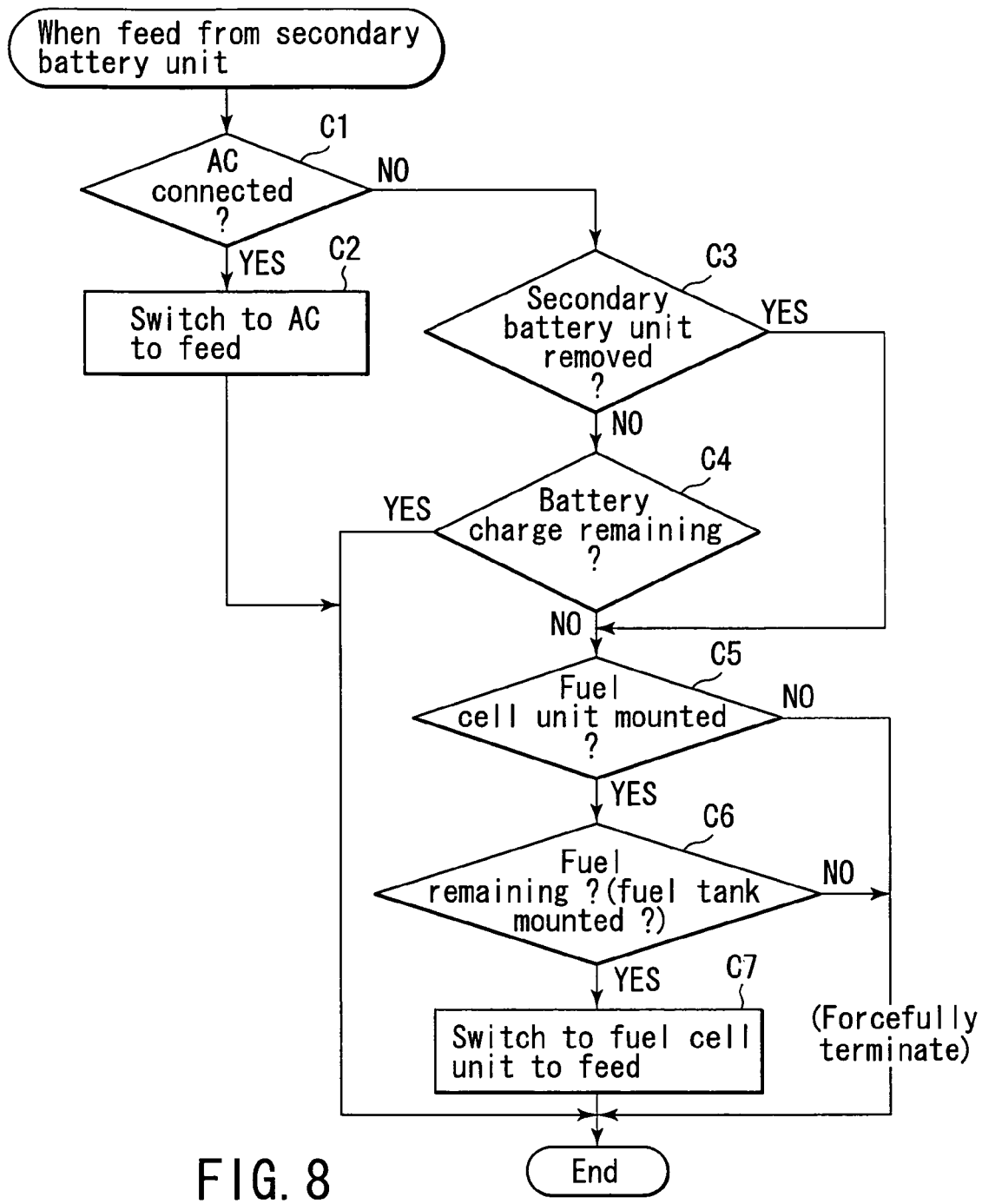
FIG. 8 is a flowchart illustrating the follow of the feed switch control at the time of feeding electricity from the secondary battery unit of the electronic apparatus of the embodiment.

FIG. 8 is a flowchart illustrating the follow of the feed switch control at the time of feeding electricity from the secondary battery unit 3.

When the electricity is fed from the secondary battery unit 3, the power supply controller 16 examines whether or not the AC power source is connected (Step C1). If it is connected (YES in Step C1), the power supply controller 16 carries out a switching control such that the electricity is fed from the AC power source (Step C2).

On the other hand, in the case where the AC power source is not connected (NO in Step C1), then the power supply controller 16 examines whether or not the secondary battery unit 3 has been removed (Step C3), and whether or not the battery remaining amount is sufficient (Step C4). If the secondary battery unit 3 has been removed (YES in Step C3), or the battery remaining amount is not sufficient (NO in Step C4), the power supply controller 16 then examines whether or not the fuel cell unit 2 is mounted (Step C5).

If the fuel cell unit 2 is mounted (YES in Step C5), the power supply controller 16 then examines if the fuel tank 221 contains a sufficient amount of fuel to execute the startup operation, the examination here including whether or not the fuel tank 221 is mounted (Step C6). If there is a sufficient amount of fuel remaining (YES in Step C6), the power supply controller 16 carries out a switching control such that the electricity is fed from the fuel cell unit 2 (Step C7).

It should be noted that in the case where the fuel cell unit 2 is not mounted (NO in Step C5) or there is not sufficient amount of fuel remaining in the mounted unit (NO in Step C6), the electronic apparatus 1 is forcefully turned off.

Figure 9:
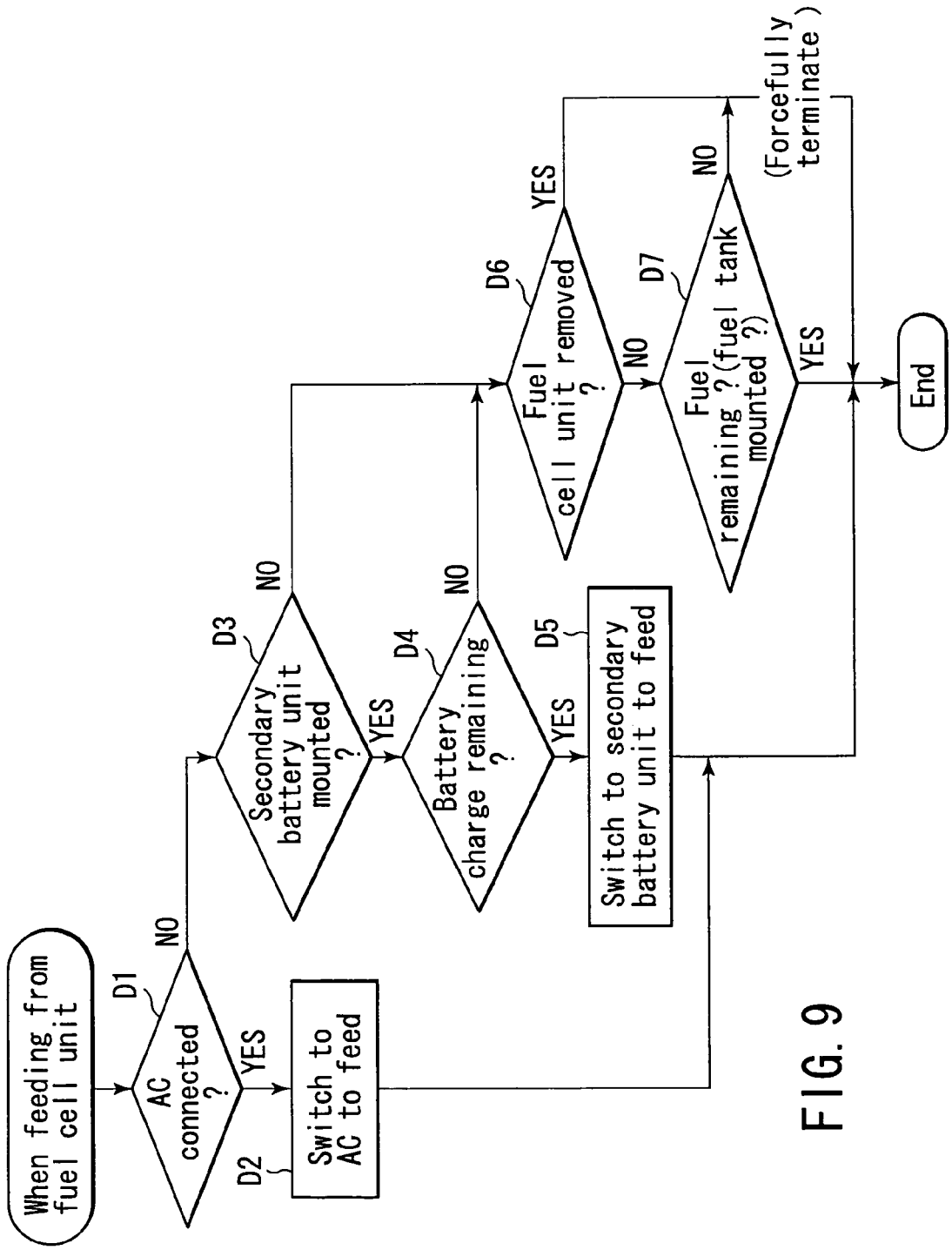
FIG. 9 is a flowchart illustrating the follow of the feed switch control at the time of feeding electricity from the fuel cell unit of the electronic apparatus of the embodiment.

FIG. 9 is a flowchart illustrating the follow of the feed switch control at the time of feeding electricity from the fuel cell unit 2.

When the electricity is fed from the fuel cell unit 2, the power supply controller 16, first, examines whether or not the AC power source is connected (Step D1). If it is connected (YES in Step D1), the power supply controller 16 carries out a switching control such that the electricity is fed from the AC power source (Step D2).

On the other hand, in the case where the AC power source is not connected (NO in Step D1), then, the power supply controller 16 examines whether or not the secondary battery unit 3 is mounted (Step D3). If the secondary battery unit 3 is mounted (YES in Step D3), the power supply controller 16 examiners whether or not the battery remaining amount is sufficient (Step D4). If the battery remaining amount is sufficient (YES in Step D4), the power supply controller 16 carries out a switching control such that the electricity is fed from the secondary battery unit 3 (Step D5).

It should be noted that in the case where the secondary battery unit 3 is not mounted (NO in Step D3) or the battery remaining amount is not sufficient (NO in Step D4), if the fuel cell unit 2 is removed (YES in Step D6) or the amount of fuel remaining becomes insufficient (NO in Step D7), the electronic apparatus 1 is forcefully turned off.

As described above, the electronic apparatus 1 carries out switch control, that is, which one of the Ac power source, the fuel cell unit 2 and the secondary battery unit, the electricity should be fed, automatically depending on the condition.

Note that the flow of the feed switch control illustrated in each of FIGS. 8 and 9 is based on such a presumption that the feed switch control is carried out with a priority given to the secondary battery unit 3 rather than the fuel cell unit 2 in consideration of the cost for purchasing the fuel tank 211 which is a consumable item. However, as mentioned before, there may be, in some cases, a demand of using the fuel cell unit 2 with a priority rather than the secondary battery unit 3. In order to meet this demand, it suffices if the process of switching to the feeding from the fuel cell unit 2 when the unit 2 is mounted, is inserted between Steps C1 and C3 of FIG. 8 and then Steps D3 to D5 of FIG. 9 are moved to the site after "NO" of Step D7.

Figure 10:
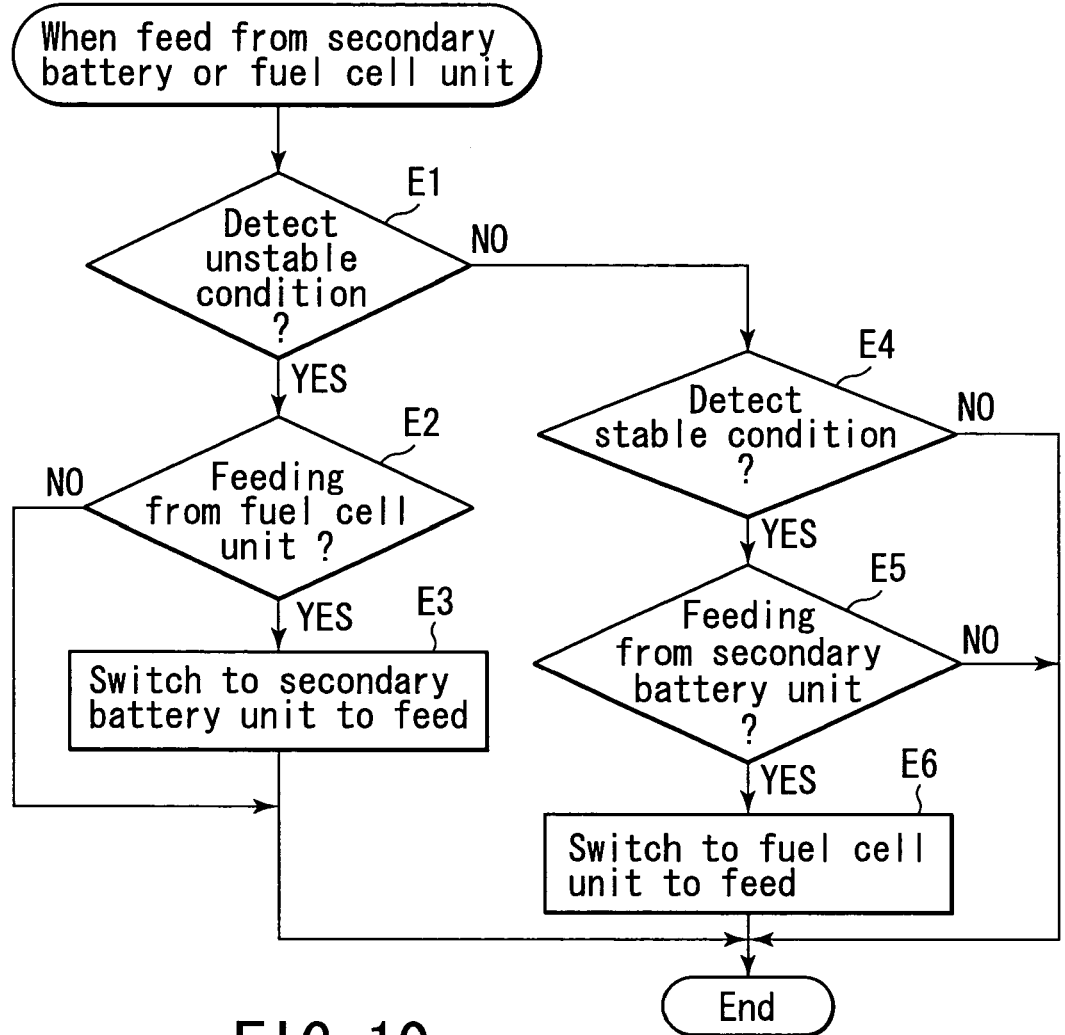
FIG. 10 is a flowchart illustrating the follow of the feed switch control when it is automatically switched in accordance with the state of the electronic apparatus of the embodiment, that is, whether the apparatus is in a stable condition or not.

The fuel cell unit 2 generates electricity by using liquid methanol as fuel, and therefore the use of the unit in an unstable condition such as in a train is not preferable. In consideration of such a case, the mechanism of feed switch control for automatically selecting which one of the fuel cell unit 2 and the secondary cell unit 3, the electricity should be fed from, in accordance with whether or not the electronic apparatus 1 is in a stable condition, will now be described. FIG. 10 is a flowchart illustrating the follow of the feed switch control executed by the power supply controller 16 of the electronic apparatus 1 in the above-descried case.

An acceleration sensor 162 is a sensor that uses, for example, a capacitor having two opposing electrodes. The mechanism of the sensor is as follows. That is, when the sensor is inclined or accelerated, a displacement is created between the two electrodes, in other words, an overlapping portion between the two is varied. Based on the variation of the overlapping portion, the inclination and acceleration are calculated and output. The power supply controller 16 is monitoring signals outputted from the acceleration sensor 162. If the signals indicate that the apparatus is inclined or accelerated for a certain period of time or more without interruption, it is judged that the electronic apparatus 1 is in an unstable condition (Yes in Step E1).

When it is judged that the apparatus is in an unstable condition, the power supply controller 16 examines whether or not the apparatus is fed from the fuel cell unit 2 (Step E2). If it is fed from the fuel cell unit 2 (YES in Step E2), the power supply controller 16 carries out switch control so that the apparatus is fed from the secondary battery unit 3 (Step E3).

On the other hand, in the case where, for example, the apparatus is not inclined or accelerated for a certain period of time or more, the power supply controller 16 judges that the apparatus is in a stable condition (NO in Step E1, YES in Step E4). In this case, the power supply controller 16 examines if the apparatus is fed from the secondary battery unit 3 (Step E5). If it is fed from the secondary battery unit 3 (YES in Step E5), the power supply controller 16 carries out switch control so that the apparatus is fed from the fuel cell unit 2 (Step E6).

As described above, the electronic apparatus 1 carries out switch control of automatically selecting one of the fuel cell unit 2 and the secondary battery unit 3 to feed the electricity to the apparatus depending on whether the apparatus 1 is in a stable condition or unstable condition.

Further, it would be possible to more flexibly deal with the environment in which each user uses the apparatus, if the user becomes able to carry out, by himself or herself, the settings for various conditions, that is, how the feeding is switched in a stable condition, an unstable condition, or in the startup operation, etc. In order to achieve this, a utility software program is prepared for the electronic apparatus 1, which provides, for example, a power source setting screen image as shown in FIG. 11, and thus the setting of the feed switch control can be done by the user himself or her self for each respective condition.

Figure 11:
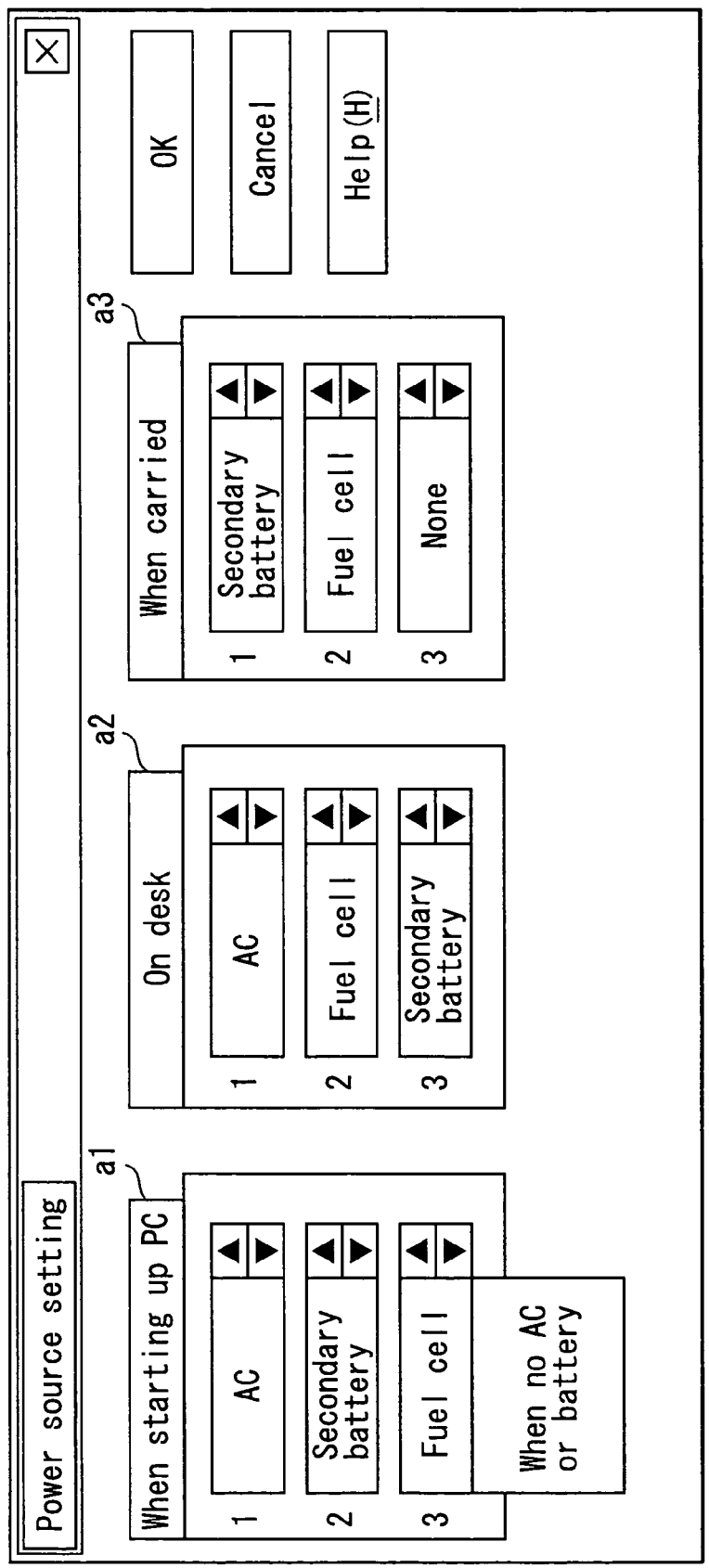
FIG. 11 is a diagram showing a power setting screen image to be displayed by the electronic apparatus of the embodiment.

The power source setting screen image shown in FIG. 11 has three setting regions for the startup of the personal computer (a1), for the situation where the computer is placed on a desk (a2) and for the situation where it is being carried by the user (a3). With this screen image, the user can set the priority order of the AC power source, the fuel cell unit 2 and the secondary battery unit 3 depending on the respective one of the conditions a1 to a3. This setting is stored in the register 161 of the power supply controller 16, and based on the contents of the register 161, the power supply controller 16 carries out feed switch control.

In the example shown in FIG. 11, the priority order is set to the AC power source, the fuel cell unit 2 and the secondary battery unit 3 at the time of starting up the computer. Further, when in a stable condition, the priority is set to the AC power source, the fuel cell unit 2 and the secondary battery unit 3 in the order presented, and when in an unstable condition, the priority is set to the fuel cell unit 2 and the secondary battery unit 3 in the order presented. Thus, the user can set a desired feed switch control and make the power supply controller 16 to operate in accordance with the desired setting.

It should be noted that the above-described embodiment was discussed in connection with the case where the use status of the AC power source, the fuel cell unit 2 and the secondary battery unit 3 is displayed in the form of icon indicated within a task tray of the LCD 141. The present invention, however, is not limited to this, but the use status can be indicated on, for example, a display device that can be also used as a touch panel.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus, comprising:
    a main body;
    a first battery unit having a fuel cell configured to supply power to the main body;
    a second battery unit having a secondary battery configured to supply power to the main body;
    a detecting unit configured to detect whether the main body is in a stable condition; and
    a control unit configured to switch a source of the power from the first battery unit to the second battery unit, when the detecting unit detects that the main body is in an unstable condition for a predetermined period of time or more without interruption while the power is being supplied from the first battery unit.

2. The electronic apparatus of claim 1, wherein the detecting unit is an acceleration sensor.

3. A method of supply switch control for an electronic apparatus including a first battery unit equipped with a fuel cell, a second battery unit equipped with a secondary battery, and being operable on power supplied from the first battery unit or the second battery unit, the method comprising:
    detecting whether or not the electronic apparatus is placed in a stable condition; and
    switching a source of the power from the first battery unit to the second battery unit, when it is detected that the electronic apparatus is in an unstable condition for a predetermined period of time or more without interruption while the power is being supplied from the first battery unit.

* * * * *